(12) United States Patent
Shirani-Mehr et al.

(10) Patent No.: US 9,344,177 B2
(45) Date of Patent: *May 17, 2016

(54) METHOD AND APPARATUS FOR THE JOINT DESIGN AND OPERATION OF ARQ PROTOCOLS WITH USER SCHEDULING FOR USE WITH MULTIUSER MIMO IN THE DOWNLINK OF WIRELESS SYSTEMS

(71) Applicants: Hooman Shirani-Mehr, Palo Alto, CA (US); Haralabos C. Papadopoulos, Palo Alto, CA (US); Sean A. Ramprashad, Palo Alto, CA (US); Giuseppe Caire, Palo Alto, CA (US)

(72) Inventors: Hooman Shirani-Mehr, Palo Alto, CA (US); Haralabos C. Papadopoulos, Palo Alto, CA (US); Sean A. Ramprashad, Palo Alto, CA (US); Giuseppe Caire, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 46 days.

This patent is subject to a terminal disclaimer.

(21) Appl. No.: 14/466,854

(22) Filed: Aug. 22, 2014

(65) Prior Publication Data

US 2014/0362810 A1    Dec. 11, 2014

Related U.S. Application Data

(62) Division of application No. 13/664,188, filed on Oct. 30, 2012, now Pat. No. 8,972,827, which is a division of application No. 12/862,651, filed on Aug. 24, 2010, now Pat. No. 8,327,214.

(60) Provisional application No. 61/237,046, filed on Aug. 26, 2009.

(51) Int. Cl.
   *H04L 1/18*    (2006.01)
   *H04B 7/06*    (2006.01)

(Continued)

(52) U.S. Cl.
   CPC ............ *H04B 7/0647* (2013.01); *H04B 7/0452* (2013.01); *H04L 1/1819* (2013.01);

(Continued)

(58) Field of Classification Search
   None
   See application file for complete search history.

(56) References Cited

U.S. PATENT DOCUMENTS 6,971,050 B1 * 11/2005 Ohbuchi ........... H03M 13/2703
                                                    714/701
2005/0246617 A1    11/2005 Kyung et al.

(Continued)

FOREIGN PATENT DOCUMENTS

WO    2007109634 A1    9/2007

OTHER PUBLICATIONS

PCT/US2010/046691, International Search Report, Feb. 2, 2011, 4 pages.

(Continued)

*Primary Examiner* — M. Mujtaba K Chaudry
(74) *Attorney, Agent, or Firm* — Blakely, Sokoloff, Taylor & Zafman LLP

(57) ABSTRACT

A method and apparatus is disclosed herein for performing wireless communication. In one embodiment, the apparatus comprises a processing unit to run a scheduling selection algorithm to update user terminal scheduling weights in response to scheduling feedback transmitted by a plurality of user terminals by an end of an immediately preceding scheduling event; a scheduler and precoder, responsive to the updated user terminal scheduling weights generated by the scheduling algorithm and channel estimates of user terminals, to choose a set of user terminals for scheduling and to choose precoder beams and their power for such user terminal in the set of user terminals; a plurality of precoding blocks to receive one coded ARQ block for at least one packet for each user terminal in the set and, responsive to the precoder beams, to generate precoded data, where the one coded ARQ block is one of a plurality of ARQ blocks generated for a single packet and being generated using a single ARQ scheme for such each user terminal; and a transmitter to transmit the precoded data using MIMO transmission.

12 Claims, 8 Drawing Sheets

(51) Int. Cl.
*H04B 7/04* (2006.01)
*H04L 1/00* (2006.01)
*H04L 25/02* (2006.01)
*H04W 28/04* (2009.01)
*H04W 72/12* (2009.01)

(52) U.S. Cl.
CPC ............ H04L1/1822 (2013.01); H04L 1/1845 (2013.01); H04L 1/1861 (2013.01); H04L 1/1887 (2013.01); H04W 72/1205 (2013.01); *H04B 7/0417* (2013.01); *H04L 1/0025* (2013.01); *H04L 25/0202* (2013.01); *H04W 28/04* (2013.01); *H04W 72/1226* (2013.01)

(56) References Cited

U.S. PATENT DOCUMENTS

| | | | | |
|---|---|---|---|---|
| 2007/0223416 A1* | 9/2007 | Baker | .................. | H04L 1/1685 370/328 |
| 2008/0012764 A1* | 1/2008 | Kang | .................. | H04B 7/0634 342/367 |
| 2008/0080470 A1* | 4/2008 | Yano | .................. | G08C 15/00 370/342 |
| 2008/0101285 A1* | 5/2008 | Venkatachalam | ..... | H04L 1/1607 370/329 |
| 2008/0101290 A1* | 5/2008 | Sung | .................. | H04L 1/1825 370/331 |
| 2009/0232122 A1* | 9/2009 | Suda | .................. | H04B 7/0417 370/345 |

OTHER PUBLICATIONS

PCT/US2010/046691, Written Opinion, Feb. 2, 2011, 5 pages.
PCT/US2010/046691, International Preliminary Report on Patentability, Mar. 8, 2012, 6 pages.
Caire, Giuseppe, et al, "Multiuser MIMO Downlink with Limited Inter-Cell Cooperation: Approximate Interference Alignment in Time, Frequency, and Space," Forty-Sixth Annual Allerton Conference, Sep. 23-26, 2008, pp. 730-737.
Caire, Giuseppe, et al, "The Throughput of Hybrid-{ARQ} Protocols for Guassian Collision Channel," IEEE Trans on Inform Theory, vol. 47, No. 5, Jul. 2001, pp. 1971-1988.
Ivrlac, MT, et al, "Intercell-Interference in the Guassian MISO Broadcast Chanel," Global Telecommunications Conference, Nov. 26-30, 2007, pp. 3195-3199.
Ramprashad, Sean, et al, "Cellular vs. Network MIMO: A Comparison Including the Channel State Information Overhead," Proc IEEE Intern Symp on Personal, Indoor and Mobile Radio Commun, PIMRC'07, Sep. 2009, pp. 878-884.

* cited by examiner

METHOD AND APPARATUS FOR THE JOINT DESIGN AND OPERATION OF ARQ PROTOCOLS WITH USER SCHEDULING FOR USE WITH MULTIUSER MIMO IN THE DOWNLINK OF WIRELESS SYSTEMS

PRIORITY

The present patent application is a divisional of and incorporates by reference U.S. patent application Ser. No. 13/664,188, titled "Method and Apparatus for the Joint Design and Operation of ARQ Protocols with User Scheduling for Use with Multiuser MIMO in the Downlink of Wireless Systems," filed Oct. 30, 2012, which is a divisional of U.S. patent application Ser. No. 12/862,651, titled "Method and Apparatus for the Joint Design and Operation of ARQ Protocols with User Scheduling for Use with Multiuser MIMO in the Downlink of Wireless Systems," filed Aug. 24, 2010, now U.S. Pat. No. 8,327,214, issued Dec. 4, 2012, which claims priority to and incorporates by reference the corresponding provisional patent application Ser. No. 61/237,046, titled, "Method and Apparatus for The Joint Design and Operation of ARQ Protocols with User Scheduling for Use with Multiuser MIMO in the Downlink of Wireless Systems," filed on Aug. 26, 2009.

FIELD OF THE INVENTION

Embodiments of the present invention relate to the field of use of user-scheduling and automatic repeat-request (ARQ) protocols (error recovery mechanisms) for delivering information bearing signals to user-terminals (UTs) in the downlink of wireless cellular systems; more particularly, the present invention relates to joint use of user-scheduling and ARQ protocols with multiuser (MU) multiple in, multiple out (MIMO) for delivering information bearing signals to user-terminals (UTs) in the downlink of wireless cellular systems.

BACKGROUND OF THE INVENTION

In communication systems, the transmission system has to make decisions about which users to schedule, and with what rates. Such decisions are made by a scheduling algorithm within the system, and transmissions in line with such decisions are formed by the multi-user transmission system, e.g. by choice of the MU-MIMO signaling.

However, a major problem in most existing systems is the fact that the maximum possible rate that can be delivered to the user in each scheduling cycle is often not known exactly. For example, in a wireless system the signal, noise and interference levels as seen by each user in a scheduling cycle are all important in being able to determine the rate that can be reliably sent to this receiving user. Unfortunately in many cellular systems such levels are not known exactly at the transmitting party at the time of transmission.

As an example, the level of inter-cell or inter-cluster interference (ICI) level varies from scheduling cycle to scheduling cycle and is often unknown for at least some scheduling cycles. Furthermore, ICI levels can often be greater than the useful-signal level for many users. Unknown ICI and other sources of uncertainty in, the system related to predicting user rates can have a significant effect on the efficiency of both the scheduling as well as MU-MIMO downlink signaling schemes since such schemes depend on such predictions.

The uncertainty in the rate the channel can support by nature necessitates the use of an error recovery mechanism, such as ARQ. This is because the transmitted rate to a user may not be supportable by the instantaneous channel a user is experiencing.

As further background, it should be noted that user-scheduling, ARQ and MU-MIMO methods, are used in many state of the art multi-user systems, and are individually well known to those familiar with the state of the art.

In many state of the art systems each base-station cluster controller (or base-station) has a number of UTs to serve. For each scheduling cycle, the scheduler in the system chooses the UTs to schedule and the power and rate allocation to such UTs. Such decisions are often based on estimates of the instantaneous channels, or quality of instantaneous channels, between the cluster and its UTs. Exploiting the variation in such channels, e.g. scheduling users in scheduling cycles when such users have very good channels, can improve overall system performance. This variation is thus exploited by the scheduler.

In trivial systems, e.g. those that simply maximize per cell throughput, the criterion directing the operation of the scheduler can often lead to a case where users are not served fairly. For example, for a criterion to maximize per cell throughput, it often makes sense to serve users near base-stations, starving as a result those users at cell edges. Thus, user scheduling is also an essential component in many systems to not only increase performance by exploiting channel variations, but to also ensure user fairness with respect to a chosen criterion.

There are many such scheduling methods to do so, known to those familiar with the state of the art. One such example is a "Proportionally Fair Scheduler (PFS)" which tries to maximize the geometric mean of the per user average throughput. Another is a "MaxMin" scheduler which tries to maximize the minimum per user average rate. Many schedulers, PFS and MaxMIn being two such examples, can be implemented by maximizing a weighted sum rate criterion. The weights are linked intimately to the criterion. In one commonly used scheduling weight generation mechanism for PFS, the weights are set as the inverse of the average throughput of each user, which is estimated in a loop with the physical layer parameters. An alternative method for generating the user-specific scheduling weights (and can be used for both MaxMin and PFS as well as a very broad range of other scheduling criteria) relies on the use of virtual queues. These procedures are well known to those familiar with the state of the art.

Effective operation of such schedulers depends often on being able to predict what rates can be delivered in each scheduling cycle to each user, if the user was scheduled in the scheduling cycle. The rates that can be delivered in each case depend on knowing the quality of the overall instantaneous channel at each UT. There are many well known methods to do so. The rate depends on, among other things, the power or covariance of the combined interference caused by all neighboring cluster transmissions. As noted earlier, this interference is referred to as intercluster interference (ICI).

The ICI power level experienced by a user depends on the instantaneous channels between the UT and neighboring cluster antennas, and the MU-MIMO precoded signals transmitted by these clusters. As a result, in principle, the instantaneous ICI experienced by each UT is not known to its cluster at the time of scheduling and transmission. This is because, by definition, clusters do not fully coordinate.

Other related uncertainties in quantities, such as partial channel-state-information (CSI) regarding the channel between each UT and its cluster, yield similar uncertainties in determining the transmission rates that can be supported by each UT instantaneous channel.

By definition, the uncertainties in the predicted user rates lead to losses in performance since the scheduler is not able to make the perfect decisions for each scheduling cycle. For example, a transmission to a user may fail if the transmission rate to the user is set higher than what the instantaneous channel can support. In such cases, outages in transmissions occur and the system can waste all or part of the resource that was available in the scheduling cycle.

One way to reduce such losses is to reduce the probability of such outages. A simple way to do so is to lower the transmission rate to users such that the probability of such an outage event is at an acceptable level. However, this often means the system operates conservatively and well below the potential throughput it can deliver. This is particularly true for edge users whose average possible rate in a scheduling cycle is often far less than larger instantaneous rates they could obtain when channels to such users are known and are instantaneously favorable.

Another way is to design the system such that such uncertainties are minimized. Reducing uncertainty can for example be achieved by techniques such as:
  Increasing the frequency reuse factor, which lowers ICI levels so that their effect, even with variation has a small effect on rate. However, increased reuse factors means less available resources per cluster (or cell) for transmission, and often an overall loss in performance.
  Reducing the variation in scheduling and transmission signals from scheduling cycle to scheduling cycle so that clusters can estimate ICI. This demonstrates the interplay between scheduling and losses. However, since such methods constrain the scheduler, system efficiency can be reduced. These methods also do not address, directly, the issue of how to link the error recovery mechanism to the scheduling, except to say it makes the job of the scheduler somewhat easier (but not easy).

Reduction in uncertainties can reduce inefficiencies. However, once uncertainties exist about potential deliverable rates, outage based approaches will not be able to fully use all available transmission resources as failed transmissions represent unused transmission opportunities.

In contrast to such methods, one can consider ARQ methods. These are a class of methods suited for settings where outage rates are high. Such methods are based on exploiting successful decoding acknowledgements sent by each UT to its cluster via a low-rate feedback channel. One particular class of such methods are known as Hybrid ARQ methods. These not only exploit feedback but are also able to reuse past unsuccessful transmissions to help in the decoding of future transmissions. In this way, the waste from "outages" is minimized.

For example, take the case where a single user is served within a sequence of scheduling cycles and the instantaneous deliverable rate to the user fluctuates within the scheduling interval. If each scheduling cycle transmission is independent then the system operates with outage where some transmissions are often lost and some possibly received.

A Hybrid-ARQ (H-ARQ) scheme has dependencies between scheduling cycle transmissions such transmissions help each other. For example, those scheduling cycles experiencing times of low possible delivered rates can be helped by other transmissions where channels are more favorable. In fact, a properly designed H-ARQ system can deliver rates close to the maximum sum throughput (the sum of all instantaneous deliverable rates over all scheduling cycles) that can be supported by the channel over the scheduling interval, albeit at a cost of decoding delay for various information bits. In general, the higher the decoding delay that can be tolerated by the user (application), the closer the delivered user throughput can be made to its maximum possible level. In the context of a user-specific (e.g., application-based) decoding delay constraint, one would want to have the H-ARQ system designed (i.e., its parameters optimized) in such a way that it maximizes the rate delivered to the user among all systems that do not violate the decoding delay constraint.

In the systems of interest, however, involving MU-MIMO transmission, with scheduling criteria, such as proportional fair scheduling (PFS), a systematic design and optimization of the UT-ARQ parameters is nontrivial. Indeed, varying the ARQ parameters of a given UT affects the rates/decoding delay trade-offs of the given UT but also those of all other UTs in the cluster. This is because a change in the ARQ parameters of a UT also affects the scheduling algorithm (e.g., the PFS weights in case a PFS criterion is used). Therefore, ARQ parameters affect the rates and users scheduled, the effective system throughput, scheduling activity fraction, decoding delays, etc. of all UTs in the cluster.

SUMMARY OF THE INVENTION

A method and apparatus is disclosed herein for performing wireless communication. In one embodiment, the apparatus comprises a processing unit to run a scheduling selection algorithm to update user terminal scheduling weights in response to scheduling feedback transmitted by a plurality of user terminals by an end of an immediately preceding scheduling event; a scheduler and precoder, responsive to the updated user terminal scheduling weights generated by the scheduling algorithm and channel estimates of user terminals, to choose a set of user terminals for scheduling and to choose precoder beams and their power for such user terminal in the set of user terminals; a plurality of precoding blocks to receive one coded ARQ block for at least one packet for each user terminal in the set and, responsive to the precoder beams, to generate precoded data, where the one coded ARQ block is one of a plurality of ARQ blocks generated for a single packet and being generated using a single ARQ scheme for such each user terminal; and a transmitter to transmit the precoded data using MIMO transmission.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
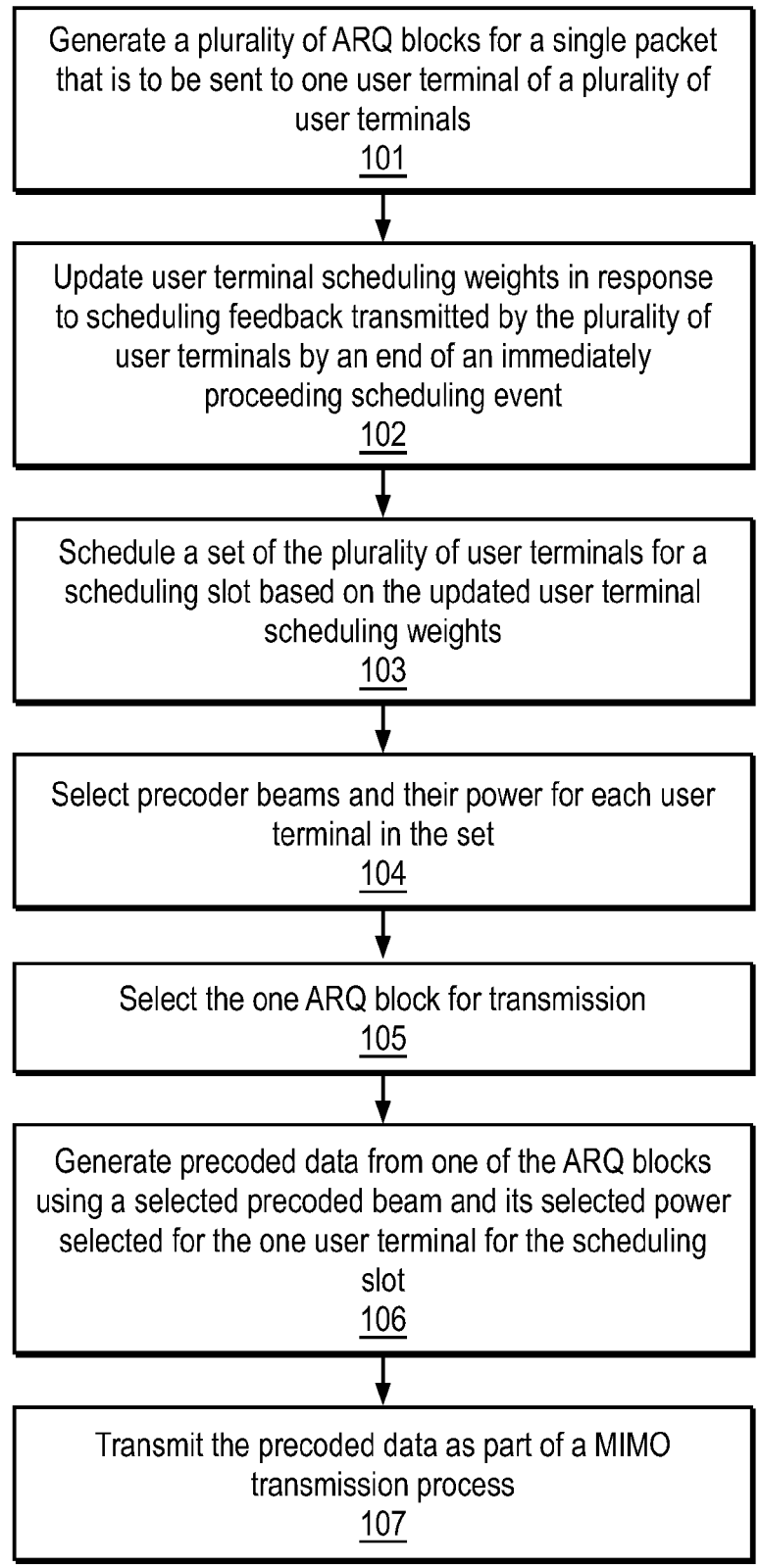
FIG. 1 is a flow diagram of one embodiment of a process for transmitting data in a wireless communication system.

Embodiments of the invention focus on the use of automatic repeat-request (ARQ) protocols in combination with a user-scheduling method for delivering information bearing signals to user-terminals (UTs) in the downlink of wireless cellular systems. Embodiments of the invention are applicable to settings involving clusters of sets of transmit antennas (collocated or not) simultaneously transmitting to UTs in their coverage area. Furthermore, these embodiments apply to the case where within each transmission cycle or instance, each cluster schedules a subset of UTs for transmission and generates multiple spatial streams that are superimposed and simultaneously transmitted from multiple antennas to such UTs. In one embodiment, the transmission method includes what is referred to as multi-user multiple-input multiple-output (MU-MIMO) transmission.

The ARQ block generation process can be performed independently of the scheduling of user terminals. That is, the ARQ scheme can be selected and ARQ blocks created for a user terminal independently of whether that UT is scheduled. The sufficient abstraction of the ARQ process from the scheduling leads to what is referred to herein as a decoupled system.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Techniques described herein combine the use of ARQ protocols with scheduling in a decoupled manner in which the ARQ parameters for each UT to achieve a desired fraction of the maximum (assumed) instantaneous UT-specific throughput given a delay constraint are decoupled from the scheduling decision of whether to schedule a particular UT.

FIG. 1 is a flow diagram of one embodiment of a process for transmitting data in a wireless communication system. The process may be performed by a processing logic which may comprise hardware, software, or a combination. The following will be described in terms of the processing logic of a base station; however, the processing logic may be part of another station, such as an access point in a wireless communication system.

Referring to FIG. 1, the process begins by processing logic generating multiple ARQ blocks for a single packet that is to be sent to one of a group of multiple user terminals (processing block 101). The multiple ARQ blocks comprise a sequence of ARQ blocks to be transmitted in a sequential order. Each of the ARQ blocks comprises coded samples. In one embodiment, the multiple ARQ blocks are generated independently of scheduling and precoding. In one embodiment, the multiple ARQ blocks are generated using a set of parameters associated with the user terminal, and the set of parameters are independent of the knowledge of the instantaneous channel between the base station's transmitter and the user terminal. In another embodiment, the ARQ blocks are generated by receiving information bits that are destined for the user terminal, splitting the received information bits into multiple packets based on an ARQ block coding rate, and applying an ARQ block generator process to each of the packets based on a signaled ARQ scheme and coding and modulation parameters to produce the multiple ARQ blocks for each of the packets. In one embodiment, the ARQ block generator process along with all its parameters, including the ARQ block coding rate and the coding and modulation parameters are set individually for each user, and independently of the instantaneous scheduler/transmission operation and the instantaneous channel conditions. In particular, these parameters are set/optimized taking into account the user-channel quality distribution across time, in the form, e.g., of a distribution of user ICI power level or user SINRs (signal to interference plus noise ratios). These quantities, however, are not instantaneous but rather estimates of ensembles of channel quality. Such quantities can be estimated and fed back by each user over long time scales, or can be also estimated at the cluster controller over time based on information fed back by each user. In general, how the ARQ parameters are set for each user are also dictated by user application constraints. In one embodiment, a user's ARQ mechanism parameters are set to optimize the delivered rate subject to an average delay constraint. For example, given a set of possible configurations, the rate/delay trade-offs of each configuration would be estimated for the given user quality distribution profile, and among the configurations not violating the application delay constraint, the one yielding the highest long term throughput would be selected.

Subsequent to generating the ARQ blocks for each single packet, processing logic updates user terminal scheduling weights in response to scheduling feedback transmitted by the user terminals by the end of the immediately preceding scheduling event (processing block 102). The end of the immediate proceeding scheduling event occurs at the end of the current transmission cycle. That is, at the end of the current transmission cycle, the user terminals transmit scheduling feedback information to be used in the next scheduling event by the base station.

After updating the user terminal scheduling weights (and moving to the next scheduling cycle), processing logic schedules a set of user terminals for the next transmission scheduling slot based on the updated user terminal scheduling weights (processing block 103) and selects precoder beams and power levels for each user terminal that has been selected for scheduling (processing block 104).

Next, processing logic selects for transmission one ARQ block from the multiple ARQ blocks generated for the one packet destined for the user terminal (processing block 105). In one embodiment, the selection of the ARQ block is performed by determining whether the one user terminal is scheduled, and if the one user terminal is scheduled, determining if feedback information, from the one user terminal, corresponding to the previously sent ARQ block for the packet is an acknowledgement (ACK) signal and selecting an ARQ block for another packet for transmission if the feedback information is an ACK signal or selecting another ARQ block of the multiple ARQ blocks for transmission if the feedback information is a negative acknowledgement (NACK) signal, where this ARQ block is the next to be transmitted in the sequential order of the ARQ blocks for the packet.

After selection of the one ARQ block for transmission, processing logic generates precoded data using a precoded beam and power selected for the one user terminal for the scheduling slot (processing block 106). Thereafter, processing logic transmits the coding precoded data (processing block 107). In one embodiment, the transmission of precoded data occurs as part of a MIMO transmission process. Transmission of the precoded data occurs such that the ARQ block for the packet are scheduled and transmitted over distinct transmission slots. In one embodiment, the transmission of precoded data includes summing multiple sets of precoded data including the precoded data generated for the one ARQ block to produce the summed output, applying OFDM to the summed output, and transmitting the results of applying the OFDM to the summed output using an RF front-end.

ARQ Block Generation Process

Figure 2:
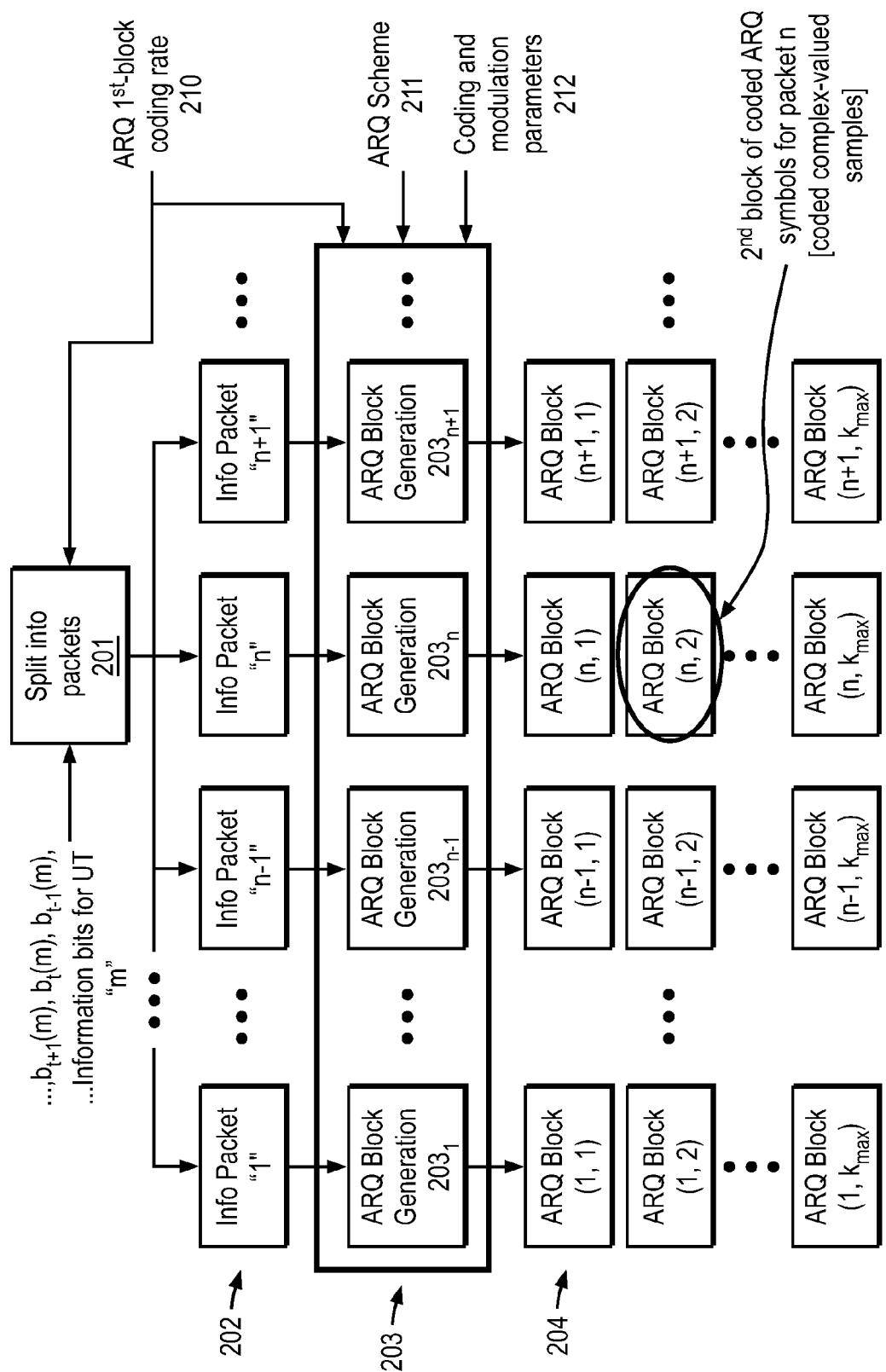
FIG. 2 illustrates one embodiment of the ARQ block generation process that depicts how information bits destined for a user terminal are partitioned into information packets for an ARQ process and are used to generate ARQ-coded blocks.
Figure 3:
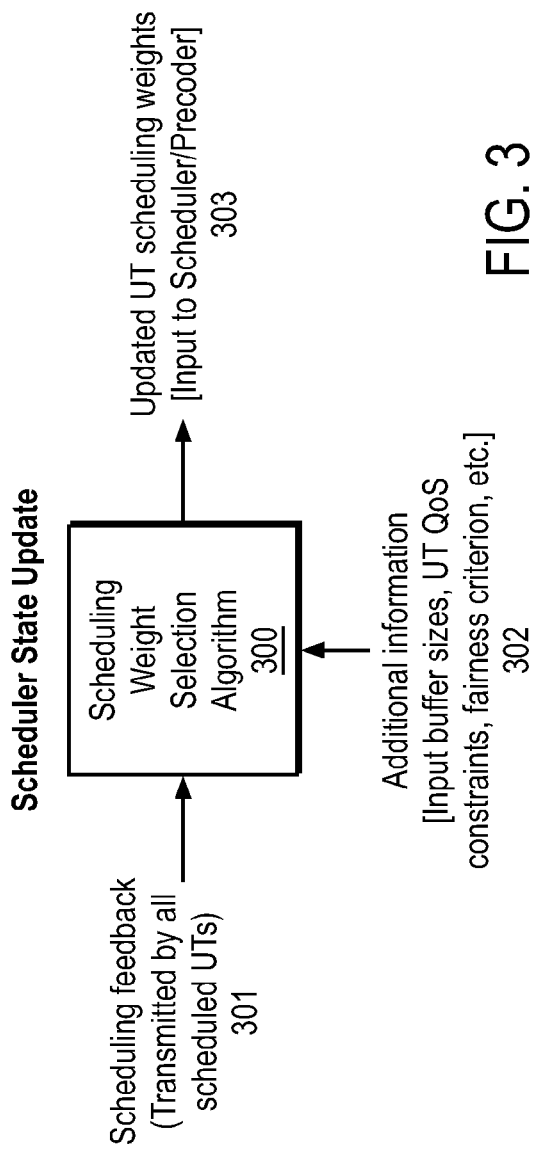
FIG. 3 illustrates one embodiment of scheduler state updating.

FIG. 2 illustrates one embodiment of the ARQ block generation process that depicts how information bits destined for a user terminal are partitioned into information packets for an ARQ process and are used to generate ARQ-coded blocks. The ARQ block generation process is performed by an ARQ block generation unit. This unit may be part of, or implemented by, a processor or control logic for the transmitter using hardware, software, or both.

Referring to FIG. 2, information bits for user terminal "m" comprise . . . , $b_{t+1}(m)$, $b_t(m)$, $b_{t-1}(m)$, . . . , are received and split into packets (202). In one embodiment, the split is based on the ARQ first-block coding rate 210. Once the parameters of the ARQ mechanism for user "m" have been defined, then these are all set; this is effectively dictated by the parameters of the selected ARQ configuration, chosen e.g., among all available ones subject to the rate or delay constraints for the given user. In one embodiment, this selection occurs on a user per user basis and is not varied from instant to instant. The packets produced as a result of the split are shown as . . . , info packets 1, . . . , info packet n−1, info packet n, and info packet n+1, . . . . Each of these packets are input into an ARQ block generation unit 203 that includes ARQ block generation sub-units $203_1$ through $203_{n+1}$. In one embodiment, each of the ARQ block generations is user specific.

The ARQ block generation sub-units $203_1$-$203_{n+1}$ generate ARQ blocks in response to the ARQ first block coding rate 210, ARQ scheme 211 and coding modulation parameters 212. In one embodiment, these parameters depend on channel quality "distribution" seen by the individual user terminal as well as the user traffic and application demands and constraints, but not the instantaneous channels that are measured and not the instantaneous precoders that are used. As mentioned above in general there is a data base of possible ARQ protocols, one per "choice" of parameters and the "choice" of parameters could comprise, e.g., the choice of modulation scheme, outer code type and memory, outer code rate, and possibly, other parameters. This is well known in the art. Note that in one embodiment, these coding and modulation parameters are set in general in a user-specific manner and are not changed instantaneously but rather over much longer time scales (e.g., as the user location changes or the user demands or decoding constraints dictated by the application change).

The outputs of the ARQ generation sub-units $203_1$-$203_{n+1}$ are the ARQ blocks, which represent blocks of coded ARQ symbols for various packets. These are coded complex-valued samples. For example, information packet n is input into ARQ block generation subunit $203_n$ to produce ARQ blocks (n, 1), ARQ block (n,2), . . . , ARQ block (n, $k_{max}$). ARQ block (n,2) represents the second block of coded ARQ symbols for packet n.

One key aspect of the techniques described herein is that the ARQ block coding rate and the associated ARQ coding mechanism parameters for any given user can be selected independently of all the other users: they can be selected based on the user channel quality distribution (which can be estimated periodically), together with either: (1) the user's average decoding delay constraints (in that case the parameters are selected to maximize the average rate delivered to the user subject to not violating the user's decoding delay constraints), or (2) the user's "optimistic" rate fraction requirements (e.g., achieve a 95% of the optimistic rate, i.e., of the best throughput predicted by theory in the "genie aided" case where the BS knows a priori the instantaneous rate supported by the channel in each instance for this user and instantaneously varies the code to match it); in the second case the parameters are picked to minimize the average user decoding delay. The attractive aspect of the whole operation is that, even though user transmissions and optimistic rates are inherently coupled through the scheduler/MIMO transmission, the optimization of the ARQ modules can be performed independently for each module and thus can be set and changed independently to match the individual user's traffic/application demands and constraints.

Examples of ARQ Parameters at UT "m"

The following provides an example of ARQ parameters used in the ARQ block generation process performed by the ARQ block generation unit. In one embodiment, well-known models are used for setting the UT-ARQ parameters. For example, a model may be used that is described in Caire et al., "The Throughput of Hybrid-{ARQ} Protocols for the Gaussian Collision Channel", *IEEE Trans. On Inform. Theory*, vol. 47, no. 5, pp 1971-1988, July 2001, which is incorporated herein by reference. A Hybrid-ARQ IR (incremental redundancy) block generation process that can be used is described below. In this case, from each information packet of bits, the scheme generates a set of coded samples, where the coded samples from a single packet are split into $k_{max}$ segments (ARQ blocks); these ARQ blocks are sequentially transmitted (preferably one block per packet per scheduling event), and sequential transmission terminates once an ACK is received, or if $k_{max}$ NACKs in a row are received (outage). Assuming UT "m" (long-term) average achievable rate (over scheduled slots) equals 0.5 bits per channel use, instantaneously achievable rate for UT "m" varies over slots, e.g., between 0.01 bits & 4 bits per channel use; and 100 coded-ARQ samples are sent per transmission.

The coding & modulation (C&M) parameters produce $k_{max} \times 100$ complex samples that are sent over $k_{max}$ transmissions, and information bits are passed through a rate-Re binary code, followed by an interleaver followed by mapper to Q-QAM to produce $k_{max} \times 100$ complex samples for the $k_{max}$ 100-sample transmissions.

Consider 3 C&M cases, all giving effective rate 0.4 bits/channel use after a total of $k_{max}$ TXs: QPSK (4-QAM) with Rc=1/5; 16-QAM with Rc=1/10; and 64-QAM with Rc=1/15.

Tables below show for various $k_{max}$ values: the 1st block coding rate ("R1"); $k_{min}$ (the index of the received ARQ block after which the UT can start decoding (before that it's all "NACK"s), and $k_{avg}$ (the smallest number of transmissions required for the coding rate to become equal to or fall below the average achievable rate). Each packet of information bits has 100 R1 bits.

| 16-QAM, $R_c = 1/10$ | | | | |
|---|---|---|---|---|
| $k_{max}$ | 5 | 10 | 15 | 20 |
| $R_1$ | 2 | 4 | 6 | 8 |
| $k_{min}$ | 1 | 1 | 2 | 2 |
| $k_{avg}$ | 4 | 8 | 12 | 16 |

| QPSK, $R_c = 1/5$ | | | | |
|---|---|---|---|---|
| $k_{max}$ | 5 | 10 | 15 | 20 |
| $R_1$ | 2 | 4 | 6 | 8 |
| $k_{min}$ | 1 | 2 | 3 | 4 |
| $k_{avg}$ | 4 | 8 | 12 | 16 |

| 64-QAM, $R_c = 1/15$ | | | | |
|---|---|---|---|---|
| $k_{max}$ | 5 | 10 | 15 | 20 |
| $R_1$ | 2 | 4 | 6 | 8 |
| $k_{min}$ | 1 | 1 | 1 | 1 |
| $k_{avg}$ | 4 | 8 | 12 | 16 |

Note that each of the blocks that are produced as part of the ARQ block generation process represent different coded versions of the packet and these coded blocks are sent across different scheduling instances. That is, the scheduler schedules one of the k ARQ blocks associated with the packet at one scheduling instance and any other ARQ block associated with the same information packet is sent over a different scheduling instance. If there are additional ARQ blocks to be sent for different packets, they may be sent in the same scheduling instance as an ARQ block for another packet as long as there is time available in the transmission slot. Alternatively, one could decide that for a given user terminal "m" within each scheduling slot "$K_m$" information packets would be served. In that case the transmission in each scheduling slot where user terminal "m" gets served would be split into "$K_m$" chunks, each chunk serving a different information packet (i.e, the kth chuck serving the kth packet then the kth chunk would be used to transmit the next ARQ-block in the queue for the kth information packet).]

Scheduler State Update

In response to scheduling feedback 301 and additional information 302, which may include input buffer sizes, user terminal QOS constraints, fairness criteria, etc., the scheduling weight selection algorithm 300 executed by processing logic of the base station generates updated user terminal scheduling weights 303 in a manner well known in the art.

In one embodiment, the scheduling feedback represents low rate feedback information because it is sent by the user terminals every time the user terminal is scheduled and is sent at the end of the transmission slot because it is going to be used in the next transmission or in the next scheduling instance to decide whether the user terminal can be scheduled or not. It could also be aggregated and updated every several scheduling cycles. Alternatively a coarser version can be fed back. As an example, PFS may be used where the scheduler weights are the inverses of the user's time-averaged long term optimistic rates. In that case, at the end of the scheduling cycle, a scheduled user terminal need not need have to feed the optimistic user rate. Instead, it can locally compute its time-averaged optimistic rate, differentially encode it and feed it to the base station so that the base station could compute its scheduling weight. Such differential encoding of a slowly varying time averaged rate requires a much lower feedback bandwidth per user terminal.

Note that the input buffer sizes are utilized to determine whether there is information available to send to the user terminal. In a case where there is no information to be sent to the user terminal, their weight would be zero, such that they would not be selected for transmission during the next transmission slot.

The delay or fairness constraints may be used such as in a PFS algorithm. In one embodiment, where the weights for all users are the same, and the scheduler is PFS, the PFS operates equivalently (in terms of which users it schedules and the relative rate to such users) as a system where each user gets its maximum (assumed) instantaneous UT-specific throughput. Delay or fairness constraints and their use in scheduling are well known in the art.

In one embodiment, the updated UT scheduling weights 303 are input into a joint scheduler/precoder for scheduling in the next scheduling instance/cycle.

Scheduler/Precoder Operation

In one embodiment, the scheduling algorithm (e.g., a joint ZFBF+PFS algorithm) is run by each scheduler/precoder of the base station independently in order to schedule users and transmissions within each scheduling instance. The scheduler/precoder may be part of a cluster controller in the base station.

The scheduling algorithm receives the UT channel estimates (between the transmit antennas and UTs) for the given resource block, statistical information about unknown rate relevant parameters (e.g., the ICI level experienced by the UT (e.g., the UT average ICI) in the resource block), and scheduling parameters (e.g., PFS user weights for PFS) as inputs.

The scheduler/precoder executes the selection algorithm to decide how to bias what user terminal gets scheduled using the scheduling weights. If all of the scheduling weights are the same, all user terminals are biased in the same manner and the selection of user that achieves the highest sum rate are selected for transmission. If the scheduling weights are different, such as, for example, user terminal "A" has a weight twice as large as user terminal "B", for the user terminal with the smaller weight to be scheduled (i.e., terminal "A"), its predicted delivered rate must be at least twice as large as the predicted deliverer rate to user terminal "B". Furthermore, in multi-user MIMO, where the weighted sum-rates of multiple users are considered at a time, then the selection and scheduling occurs jointly with 2 or more user terminals simultaneously being served and their weighted sum rate determines what group of user terminals are scheduled.

Figure 4:
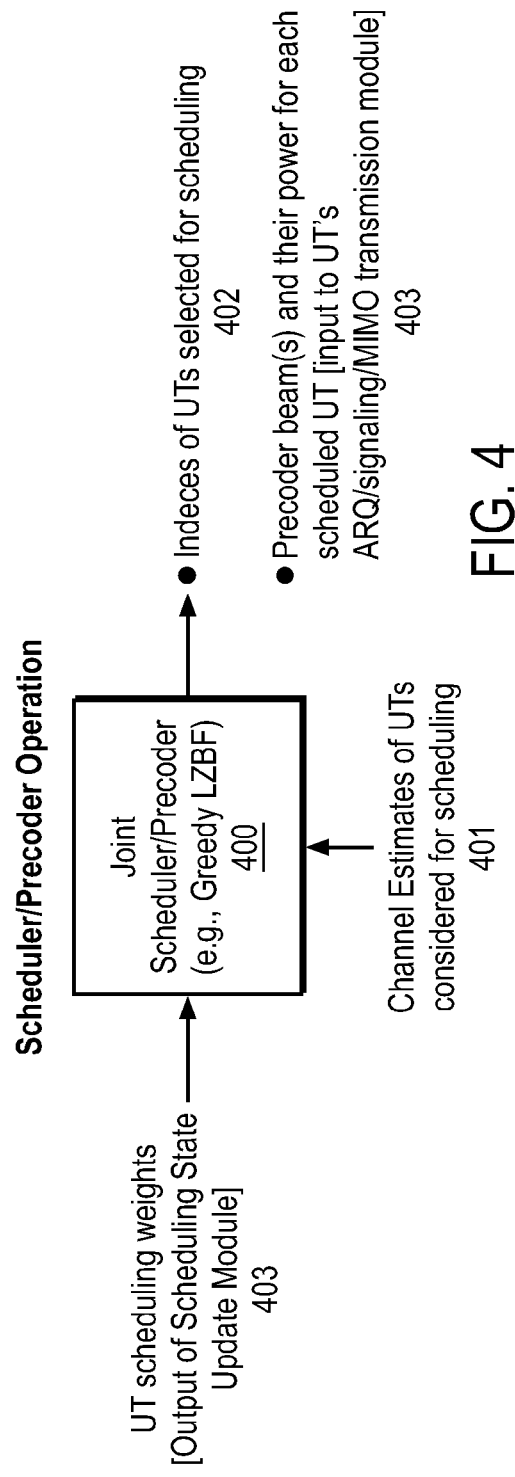
FIG. 4 illustrates a joint scheduler/precoder.

FIG. 4 illustrates a joint scheduler/precoder 400. In one embodiment, the joint scheduler/precoder comprises a greedy LZBF, which is well known in the art. Joint scheduler/precoder 400 receives UT scheduling weights 303 from the scheduler state update module running the scheduling weight selection algorithm 300, along with channel estimates of the user terminals considered for scheduling 401. In response to these inputs, joint scheduler/precoder 400 generates indices of user terminals selected for scheduling 402 and a user-specific precoder beam vector and its power for each scheduled user terminal 403. Thus the joint scheduler/precoder 400 selects user terminals, specifies which user terminals are selected, and it also decides at what power and on what beam to put each transmission.

The indices of the user terminals selected for scheduling 402 and the precoder beams and their powers are input to the ARQ signaling/MIMO transmission module (403).

In one embodiment, the scheduler uses a "Greedy ZFBF PFS" algorithm as specified in Caire et al., "Multiuser {MIMO} downlink with limited inter-cell cooperation: Approximate interference alignment in time, frequency and space", in *Proc. 46$^{th}$ Allerton Conf. Commun, Control and Computing*, Monticello, Ill., October 2008, and Ramprashad et al., "Cellular vs. network MIMO: A comparison including the channel state information overhead", in *Proc. IEEE Intern. Symp. On Personal, Indoor and Mobile Radio Commun. PIMRC'07*, Tokyo, Japan, September 2009, which is incorporated herein by reference. However, note that there are many well-known scheduling/MU-MIMO algorithms that can be used.

ARQ Blocks for Selection Process for a User Terminal

The ARQ signaling/MIMO transmission module also receives one or more ARQ blocks that are selected for transmission to the user terminal. Similarly, ARQ blocks selected for transmission to other user terminals are also input to respective ARQ signaling/MIMO transmission modules.

Figure 5:
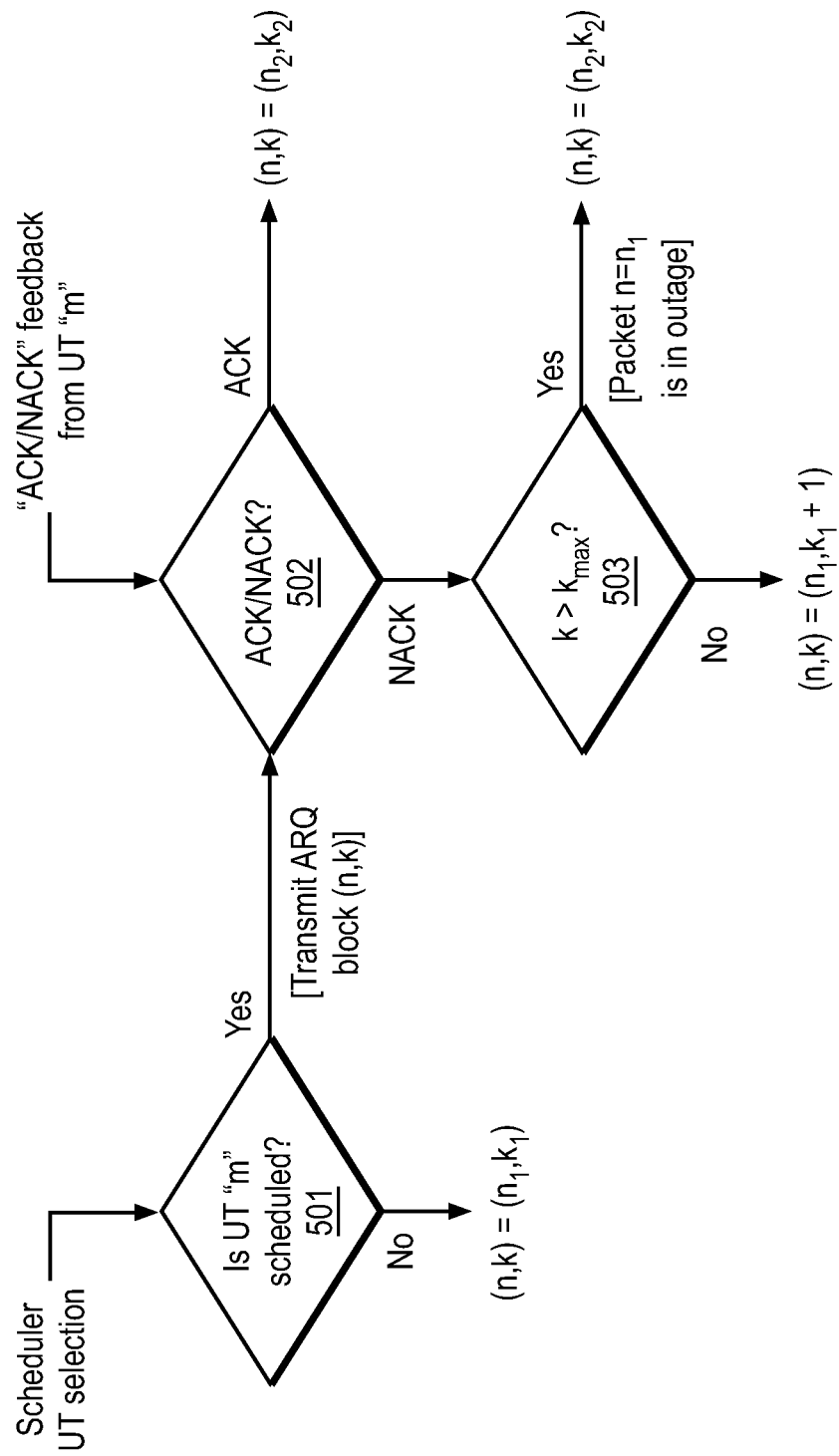
FIG. 5 illustrates one embodiment of an ARQ block selection process.

FIG. 5 illustrates one embodiment of an ARQ block selection process. The process is performed by processing logic that may comprise hardware, software, or both.

In FIG. 5, the state variable n is the index for the information packet currently being transmitted by sample ARQ-process, the state variable k is the index of the ARQ block of the information packet "n" pointed to by given ARQ process, and $k_{max}$ is the maximum number of ARQ blocks generated per packet. It is assumed that (n, k) equals $n_1, k_1$ for some integers $n_1$ and $k_1$.

Referring to FIG. 5, using the scheduler's user terminal selection, processing logic determines whether the user terminal is scheduled (processing block 501). If not, the ARQ block (n, k) is equal to $(n_1, k_1)$. If the user terminal is scheduled, the processes transmit the ARQ block (n, k) and the process transitions to processing block 502 where processing logic determines if an ACK or NACK was received based on feedback from the user terminal. If an ACK was received, processing logic selects the next block for the next packet $(n_2, k_2)$ for transmission. If a NACK is received as the feedback, processing logic transitions to processing block 503 where processing logic determines whether the index of the ARQ block for the information packet is greater than the maximum number of the ARQ blocks generated for the packet. If not, the block that is selected is the next ARQ block for the packet currently being transmitted. If the index of the ARQ block is greater than the maximum number of ARQ blocks generated per packet, the current packet is in outage and the ARQ block selected is the next ARQ block for the next packet $(n_2, k_2)$. The values of $(n_2, k_2)$ depend on whether a single ARQ process (for a given scheduled user) is served within one scheduling slot, or whether multiple ARQ processes (serving distinct information packets) are served per slot.

For example:

Single ARQ Process: $k_2=1$, $n_2=n_1+1$ (start transmission of ARQ blocks for the next information packet). In this case, when serving the current packet "n" terminates (either because of an "ACK" or because all $k_{max}$ ARQ blocks have been exhausted for the "$n_1$" packet, the process moves to serving the next packet ($n_1+1$), starting from the first ARQ-block ($k_2=1$).

Multiple parallel ARQ processes: $k_2=1$, $n_2$ is the index of the information packet with the smallest index ($>n_1$) that has not yet been associated with (served by) a parallel ARQ process.

ARQ Signaling/MIMO Transmission Module

Figure 6:
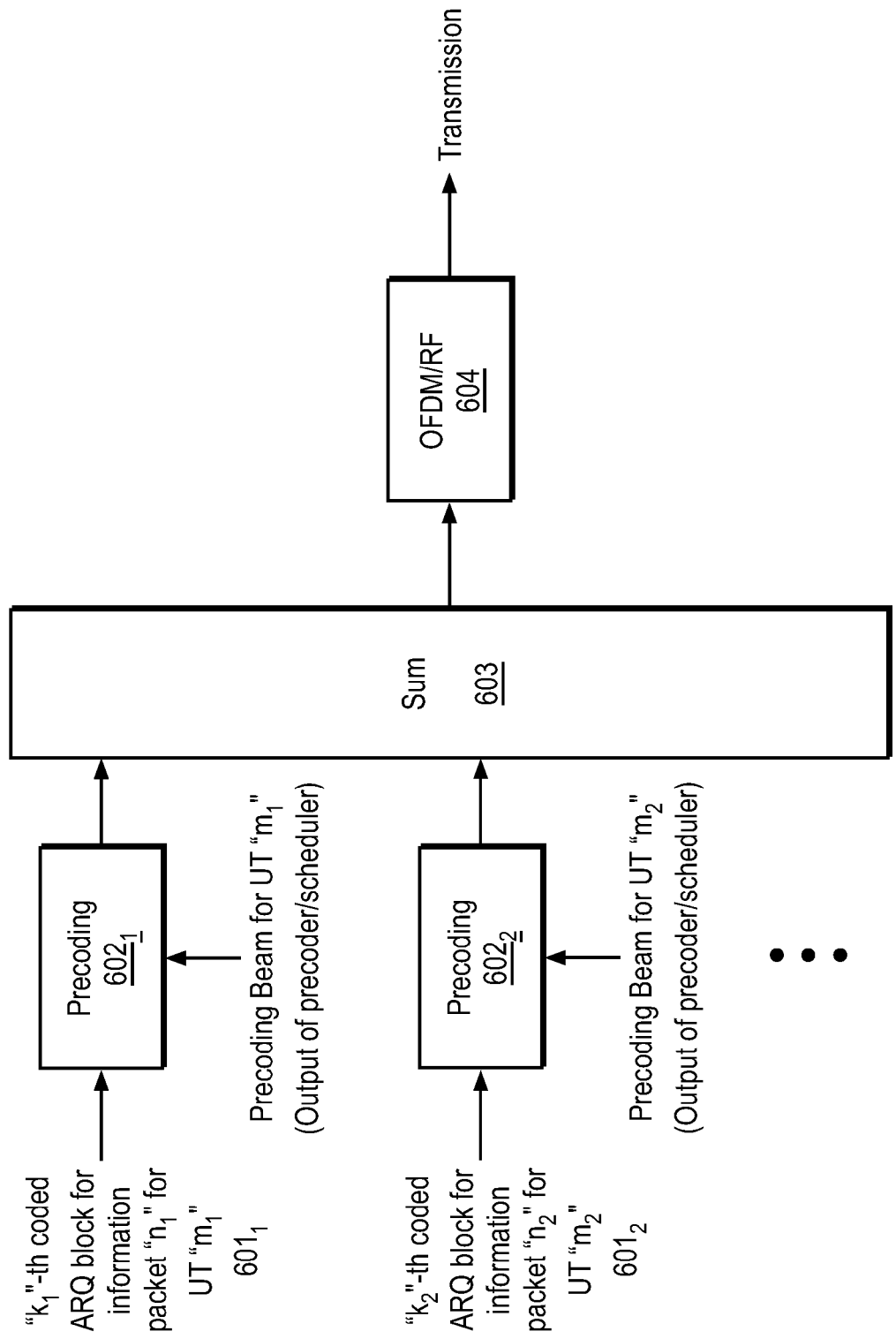
FIG. 6 illustrates the ARQ/PHY transmitter operation at the base station.

FIG. 6 illustrates the ARQ/PHY transmitter operation at the base station. Referring to FIG. 6, the ARQ blocks for each user terminal are generated independently of the precoder/scheduling operation. Thus the $k_1$-th coded ARQ block from information packet "$n_1$" for user terminal "$m_1$" is generated independently of the $k_2$-th coded ARQ block for information packet "$n_2$" for user terminal "$m_2$" as well as the instantaneous user channels over which these packets will be transmitted and the instantaneous precoders used to transmit these ARQ blocks. Each of the ARQ blocks is input into a precoder that generates precoded data in response to the precoding beam for the user terminal that is output from the scheduler/precoder, such as the scheduler/precoder shown in FIG. 4. The precoded data is input into a summer 603 which produces a summed output in a manner well known in the art. The summed output is input into OFDM/RF block 604 which applies OFDM to the summed output of summer 603 and transmits the data as part of a MIMO transmission over an OFDM subband in a manner well known in the art. Although not shown in the figure, this operation is typically performed in parallel over many different OFDM subbands, each serving/scheduling a subset of user terminals.

This module may be part of a cluster controller for use in a wireless communication system, such as MU-MIMO. The cluster controller controls a cluster of transmission antennas. Such a controller may, for example, reside in (or be synonymous with) a base-station. In one embodiment, the cluster controller includes a scheduler/precoder, an ARQ block generation mechanism, and Linear Zero Forced Beamforming (LZFB) for the MU-MIMO method being used to transmit the ARQ blocks.

Processing at the User Terminal

During its operation, the user terminal accumulates ARQ blocks in an ARQ buffer and determines whether it has received enough data to decode the information packet. When enough data has been received to decode the packet, the user terminal sends an ACK signal to the base station. In response to the ACK signal, the base station will clear any other ARQ blocks for the information packet that has been prepared and stored, such that no additional ARQ blocks for the information packet will be sent. The decoder sends a NACK to the base station to indicate to the base station that it does not have enough ARQ blocks to decode the information packet and that at least one additional ARQ block for the packet will have to be transmitted to the user terminal by the base station. This enables the base station to know to send the ARQ block that is next in the sequential order.

The user terminal also processes pilot samples that do not carry data and are used to estimate the channel of the user terminal. The channel estimate is used by the user terminal to determine the achievable rate, which forms part of the low rate scheduling feedback information that is sent by the end of the scheduling cycle and used by the base station to update the scheduler state (for use as part of the scheduling weight selection algorithm of the base station by which the base station selects user terminals for scheduling). This channel estimate enables the user terminal to estimate the best possible rate that could be achieved during the next scheduling instance. This best-possible rate estimate is based on also accounting for the instantaneous agregate interference level experienced by the user terminal due to the transmissions of other base stations and/or other sources of interference that would not be known to the base station a priori.

Figure 7:
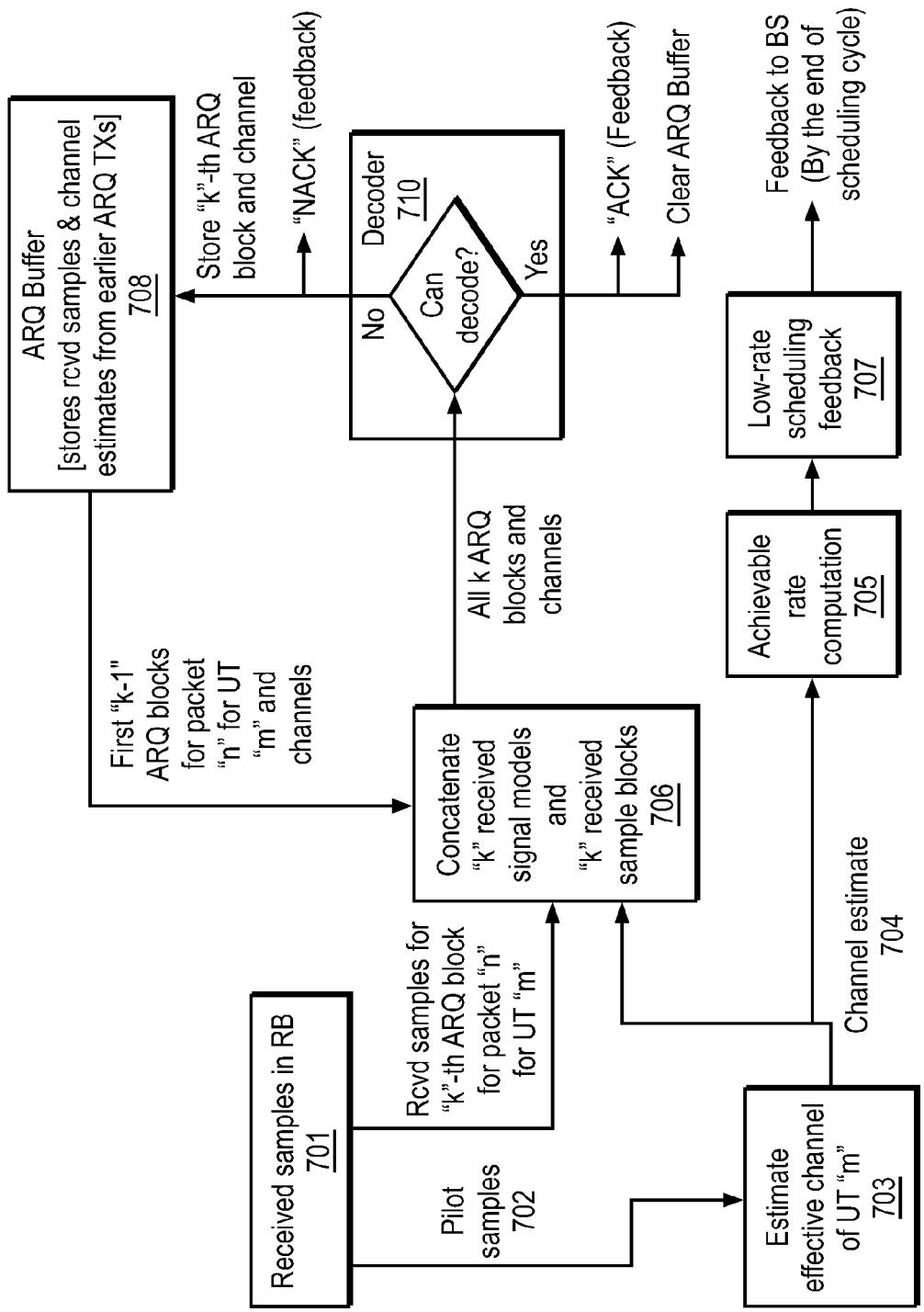
FIG. 7 illustrates the processing that occurs at a user terminal.

FIG. 7 illustrates the processing that occurs at a user terminal, such as user terminal "m". Referring to FIG. 7, samples are received in receive buffer 701. In one embodiment, the samples in receive buffer 701 are complex-valued time-frequency samples. Out of all these received complex-valued time-frequency samples in receive buffer 701, one subset of samples, pilot samples 702, carries pilot data for channel estimation, while another subset of samples contains all the data-carrying transmission symbols (e.g., channel and noise corrupted versions of the samples transmitted by the base station (e.g., encoded samples comprising the k-th ARQ block)). In one embodiment, the samples in receive buffer 701 are created as a result of processing a received signal waveform over an associated time-segment by an OFDM front-end, thereby resulting in the set of received complex-valued samples, one per time-frequency slot of the many time-frequency slot-samples.

Pilot samples 702 are sent to channel estimator 703, which estimates the effective channel of the user terminal "m" and generates a channel estimate 704 that is sent to achievable rate computation block 705 and block 706. In response to channel estimate 704, achievable rate computation block 705 determines the achievable rate for the user terminal in view of the channel estimate 704. In one embodiment, this is determined in a manner well known in the art by computing it as the base-2 logarithm of "1" plus the instantaneous SINR (signal to interference-plus-noise ratio). The achievable rate computation forms the low rate scheduling feedback 707 that is fed back to the base station at the end of the scheduling cycle. That is, this achievable rate information is fed back at the end of the current transmission cycle such that it may be used as part of the next scheduling cycle to determine whether the user terminal "m" is to be scheduled or not. As described earlier, low scheduling feedback-rate implementations are also possible.

The receiver takes the samples in this second subset (together with the channel estimates it formed for the k-th block based on the first subset of samples) and also takes all the previous blocks' received samples (and their channel estimates) which are stored in memory 708, and then performs decoding based on the totality of the received samples in ARQ blocks 1 through k, taking into account the individual channel estimates in blocks 1 through k (along with their individual quality) that vary from block to block. More specifically, the received samples received into receive buffer 701 for the "k"-th ARQ block for packet "n" for user terminal "m" are input into block 706 that also receives the channel estimate 704 and previously received ARQ blocks for packet "n", along with the channel estimates that were generated at the time those previous ARQ blocks were received. These were stored in ARQ buffer 708 at the time of the earlier transmissions. In response to these inputs, block 706 constructs a large vector comprising of the concatenation of the "k" received sample blocks, along with the associated "k" received signal SINRs (or along with the associated measured "k" {signal power, interference-plus-noise power} level pairs) and these are sent to decoder 710. In response to all the "k" ARQ blocks and channel estimates, decoder 710 determines whether it can decode the information packet from the ARQ blocks received. This occurs in a manner well known in the art. If it can, decoder 710 decodes the data and sends the ACK back to the base station and uses the Clear ARQ buffer signal to clear its own ARQ buffer (708). If not, decoder sends a NACK feedback signal to the base station and stores the "k"-th ARQ block and the channel estimate for that "k"-th ARQ block into ARQ buffer 708.

An Example of a User Terminal

Figure 8:
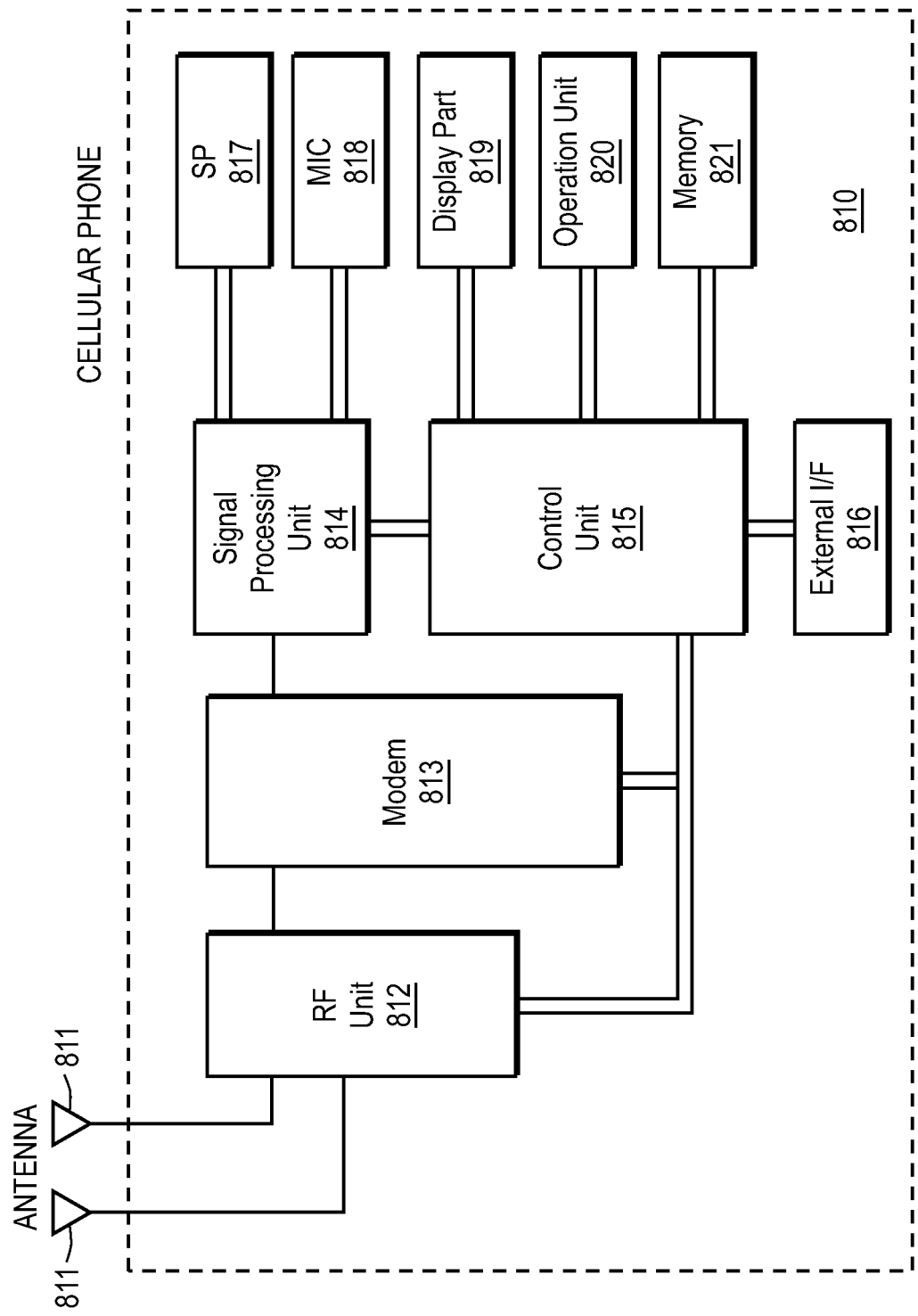
FIG. 8 is a block diagram of one embodiment of a user terminal.

FIG. 8 is a block diagram of one embodiment of a user terminal (e.g., mobile phone) that includes a transmitter and/or the receiver and includes components described above (e.g., components of FIG. 7).

Referring to FIG. 8, the cellular phone 810 includes an antenna 811, a radio-frequency transceiver (an RF unit) 812, a modem 813, a signal processing unit 814, a control unit 815, an external interface unit (external I/F) 816, a speaker (SP) 817, a microphone (MIC) 818, a display unit 819, an operation unit 820 and a memory 821.

In one embodiment, the external I/F 816 includes an external interface (external I/F), a CPU (Central Processing Unit), a display unit, a keyboard, a memory, a hard disk and a CD-ROM drive.

The CPU and the control unit 815 in cooperation with the memories of cellular phone 810 (e.g., memory 821, memory, and hard disk of the external I/F 816) cooperate to perform the operations described above.

Note that the transmitter and/or receiver may be included in other wireless devices (e.g., a wireless LAN).

The external I/F can be connected to a notebook, laptop, desktop or other computer. This can enable the user terminal to act as a wireless modem for the computer. The user terminal can be the computer's connection to the internet, WiFi and WiMAX, a local area network, a wide area network, a personal area network, Bluetooth.

An Example of a Computer System

Figure 9:
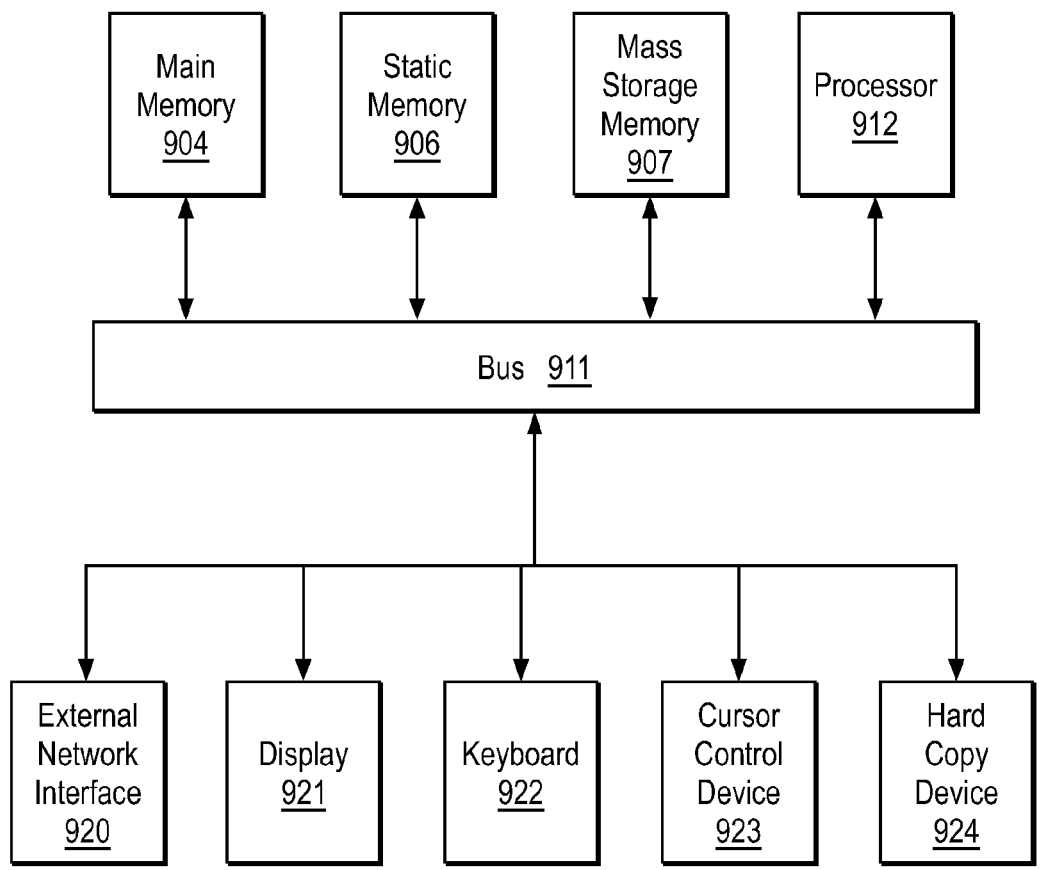
FIG. 9 is a block diagram of a computer system.

FIG. 9 is a block diagram of an exemplary computer system that may perform one or more of the operations described herein. For example, such a computer system or parts thereof could run the model described above.

Referring to FIG. 9, computer system 900 may comprise an exemplary client or server computer system. Computer system 900 comprises a communication mechanism or bus 911 for communicating information, and a processor 912 coupled with bus 911 for processing information. Processor 912 includes a microprocessor, but is not limited to a microprocessor, such as, for example, Pentium™, PowerPC™, Alpha™, etc.

System 900 further comprises a random access memory (RAM), or other dynamic storage device 904 (referred to as main memory) coupled to bus 911 for storing information and instructions to be executed by processor 912. Main memory 904 also may be used for storing temporary variables or other intermediate information during execution of instructions by processor 912.

Computer system 900 also comprises a read only memory (ROM) and/or other static storage device 906 coupled to bus 911 for storing static information and instructions for processor 912, and a data storage device 907, such as a magnetic disk or optical disk and its corresponding disk drive. Data storage device 907 is coupled to bus 911 for storing information and instructions.

Computer system 900 may further be coupled to a display device 921, such as a cathode ray tube (CRT) or liquid crystal display (LCD), coupled to bus 911 for displaying information to a computer user. An alphanumeric input device 922, including alphanumeric and other keys, may also be coupled to bus 911 for communicating information and command selections to processor 912. An additional user input device is cursor control 923, such as a mouse, trackball, trackpad, stylus, or cursor direction keys, coupled to bus 911 for communicating direction information and command selections to processor 912, and for controlling cursor movement on display 921.

Another device that may be coupled to bus 911 is hard copy device 924, which may be used for marking information on a medium such as paper, film, or similar types of media. Another device that may be coupled to bus 911 is a wired/wireless communication capability 925 to communication to a phone or handheld palm device.

Note that any or all of the components of system 900 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
generating a plurality of ARQ blocks for a single packet that is to be sent to one user terminal of a plurality of user terminals;
updating user terminal scheduling weights in response to scheduling feedback transmitted by the plurality of user terminals by an end of an immediately preceeding scheduling event;
scheduling a set of the plurality of user terminals for a scheduling slot based on the updated user terminal scheduling weights;
selecting precoder beams and their power for each user terminal in the set;
generating precoded data from one of the ARQ blocks using a selected precoded beam and its selected power selected for the one user terminal for the scheduling slot; and
transmitting the precoded data as part of a MIMO transmission process.

2. The method defined in claim 1 wherein the plurality of ARQ blocks are generated independently of scheduling and precoding.

3. The method defined in claim 1 wherein generating the plurality of ARQ blocks is performed using a set of parameters associated with the one user terminal, and wherein the set of parameters are independent of knowledge of the instantaneous channel.

4. The method defined in claim 1 wherein generating the plurality of ARQ blocks comprises:
receiving information bits for the one user terminal;
splitting the received information bits into a plurality of packets based on an ARQ block coding rate; and
applying an ARQ block generator process to each of the plurality of packets based on a signaled ARQ scheme, and coding and modulation parameters to produce a plurality of ARQ blocks for each of the plurality of packets, including the plurality of ARQ blocks for the single packet, wherein each of the ARQ blocks comprises coded samples.

5. The method defined in claim 1 wherein transmitting the precoded data occurs such that the ARQ blocks for the packet are scheduled and transmitted over distinct transmission slots (or over transmission slots corresponding to distinct scheduling events).

6. The method defined in claim 1 further comprising selecting the one ARQ block for transmission by:
determining whether the one user terminal is scheduled;
if the one user terminal is scheduled, determining if feedback information from the one user terminal for a previous one of the ARQ blocks for the packet is an acknowledgement (ACK) signal, selecting an ARQ block for another packet for transmission if the feedback information is an ACK signal; selecting the one ARQ block for transmission if the feedback information is a negative acknowledgement (NACK) signal, the plurality of ARQ blocks being a sequence of ARQ blocks to be transmitted in sequential order, and the one ARQ block being the next in the sequential order the ARQ block to be transmitted.

7. An article of manufacture having one or more computer readable storage media storing instructions thereon which, when executed by a system, cause the system to perform a method comprising:
generating a plurality of ARQ blocks for a single packet that is to be sent to one user terminal of a plurality of user terminals;
updating user terminal scheduling weights in response to scheduling feedback transmitted by the plurality of user terminals by an end of an immediately preceeding scheduling event;

scheduling a set of the plurality of user terminals for a scheduling slot based on the updated user terminal scheduling weights;

selecting precoder beams and their power for each user terminal in the set;

generating precoded data from one of the ARQ blocks using a selected precoded beam and its selected power selected for the one user terminal for the scheduling slot; and transmitting the precoded data as part of a MIMO transmission process.

8. The article of manufacture defined in claim 7 wherein the plurality of ARQ blocks are generated independently of scheduling and precoding.

9. The article of manufacture defined in claim 7 wherein generating the plurality of ARQ blocks is performed using a set of parameters associated with the one user terminal, and wherein the set of parameters are independent of knowledge of the instantaneous channel.

10. The article of manufacture defined in claim 7 wherein generating the plurality of ARQ blocks comprises:

receiving information bits for the one user terminal; splitting the received information bits into a plurality of packets based on an ARQ block coding rate; and applying an ARQ block generator process to each of the plurality of packets based on a signaled ARQ scheme, and coding and modulation parameters to produce a plurality of ARQ blocks for each of the plurality of packets, including the plurality of ARQ blocks for the single packet, wherein each of the ARQ blocks comprises coded samples.

11. The article of manufacture defined in claim 7 wherein transmitting the precoded data occurs such that the ARQ blocks for the packet are scheduled and transmitted over distinct transmission slots (or over transmission slots corresponding to distinct scheduling events).

12. The article of manufacture defined in claim 7 wherein the method further comprises selecting the one ARQ block for transmission by:

determining whether the one user terminal is scheduled;

if the one user terminal is scheduled, determining if feedback information from the one user terminal for a previous one of the ARQ blocks for the packet is an acknowledgement (ACK) signal, selecting an ARQ block for another packet for transmission if the feedback information is an ACK signal;

selecting the one ARQ block for transmission if the feedback information is a negative acknowledgement (NACK) signal, the plurality of ARQ blocks being a sequence of ARQ blocks to be transmitted in sequential order, and the one ARQ block being the next in the sequential order the ARQ block to be transmitted.

* * * * *